United States Patent
Buck et al.

(10) Patent No.: US 8,056,035 B2
(45) Date of Patent: Nov. 8, 2011

(54) METHOD AND SYSTEM FOR ANALYZING CROSS-TALK COUPLING NOISE EVENTS IN BLOCK-BASED STATISTICAL STATIC TIMING

(75) Inventors: Nathan C. Buck, Underhill, VT (US); Brian M. Dreibelbis, Underhill, VT (US); John P. Dubuque, Jericho, VT (US); Eric A. Foreman, Fairfax, VT (US); Peter A. Habitz, Hinesburg, VT (US); David J. Hathaway, Underhill, VT (US); Gregory M. Schaeffer, Poughkeepsie, NY (US); Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 12/132,636

(22) Filed: Jun. 4, 2008

(65) Prior Publication Data
US 2009/0307645 A1 Dec. 10, 2009

(51) Int. Cl.
*G06F 17/50* (2006.01)
(52) U.S. Cl. .......................... 716/113; 716/108
(58) Field of Classification Search ................. 716/5, 6, 716/108, 113
See application file for complete search history.

(56) References Cited

U.S. PATENT DOCUMENTS

| | | | |
|---|---|---|---|
| 6,615,395 B1 | 9/2003 | Hathaway et al. | |
| 7,181,711 B2 | 2/2007 | Foreman et al. | |
| 7,212,946 B1 | 5/2007 | Venkateswaran et al. | |
| 7,739,640 B2* | 6/2010 | Abbaspour et al. | 716/6 |
| 2004/0002844 A1 | 1/2004 | Jess et al. | |
| 2005/0065765 A1 | 3/2005 | Visweswariah | |
| 2005/0066296 A1 | 3/2005 | Visweswariah | |
| 2005/0066298 A1 | 3/2005 | Visweswariah | |
| 2007/0143722 A1 | 6/2007 | Venkateswaran et al. | |
| 2007/0277131 A1 | 11/2007 | Schaeffer et al. | |
| 2009/0288050 A1* | 11/2009 | Celik et al. | 716/6 |

OTHER PUBLICATIONS

U.S. Appl. No. 11/622,979, filed Jan. 12, 2007, Method and Apparatus for Static Timing Analysis in the Presence of a Coupling Event and Process Variation; Visweswariah, et al.

* cited by examiner

*Primary Examiner* — Vuthe Siek
(74) *Attorney, Agent, or Firm* — Richard Kotulak; Roberts Mlotkowski Safran & Cole, P.C.

(57) ABSTRACT

A method of performing statistical timing analysis of a logic design, including effects of signal coupling, includes performing a deterministic analysis to determine deterministic coupling information for at least one aggressor/victim net pair of the logic design. Additionally, the method includes performing a statistical timing analysis in which the deterministic coupling information for the at least one aggressor/victim net pair is combined with statistical values of the statistical timing analysis to determine a statistical effective capacitance of a victim of the aggressor/victim net pair. Furthermore, the method includes using the statistical effective capacitance to determine timing data used in the statistical timing analysis.

20 Claims, 7 Drawing Sheets

METHOD AND SYSTEM FOR ANALYZING CROSS-TALK COUPLING NOISE EVENTS IN BLOCK-BASED STATISTICAL STATIC TIMING

FIELD OF THE INVENTION

The present invention generally relates to the field of design automation, and more particularly, to a method and system for analyzing cross-talk coupling noise events in a block-based statistical static timing analysis.

BACKGROUND

With each succeeding generation of integrated circuit technology, variability is proportionately increasing. The sources of such variability include manufacturing variations, device fatigue, environmental variations and phase-locked loop (PLL) variations. In the case of manufacturing variations, the front-end-of-the-line (FEOL) which are the layers that define the active transistors show variation in the transistor's electrical characteristics. Physical quantities such as the length of the gate, depth of the semiconductor junction or thickness of the oxide cannot be perfectly controlled during manufacturing and hence show variations, which lead to variations in the behavior of the transistors. Moreover, as the physical dimensions get smaller in modern technologies, variability is proportionately increasing. In addition, the back-end-of-the-line (BEOL), which consists of the metal interconnect layers, also exhibits variability. For example, the thickness, width and inter-layer dielectric thickness of each metal layer are sources of variability. These, in turn, cause the wires to change their delay, and in fact these sources of variability can change the delay of gates which are driving them and gates which are driven by them.

A second type of variations is due to device fatigue effects such as hot electron and negative bias temperature instability (NBTI). After a long period of use in the field, for example, transistor characteristics change due to these physical phenomena, leading to changes in the delay of circuit components.

A third type of variations is due to environmental effects such as temperature and power supply voltage. A fourth type of variations is PLL variations which can include PLL jitter and duty-cycle variability.

It is to be noted that in addition to the above, there are other sources of variation such as model-to-hardware miscorrelation, silicon-on-insulator (SOI) history effects and coupling noise. These other types of variation can also be considered during statistical timing analysis of digital integrated circuits.

The variation of delays shown by gates and wires in an integrated circuit can be classified in many different ways. The variation may be from batch-to-batch during the manufacturing, wafer-to-wafer, chip-to-chip or within a single chip. Lens aberration effects during photolithography, for example, can cause variation of the effective length of transistors across a reticle field. There can be temperature and power supply voltage variations across a chip. The variations can also be classified by the time scales during which variability develops. For instance, fatigue effects cause variability over a period of years, whereas across the chip, temperature or power supply gradients can develop over seconds or milliseconds, and coupling noise variations can occur in nanoseconds or picoseconds. Whichever way the variations of delays are classified, it is abundantly clear that these sources of variation are making integrated circuit analysis and design more difficult and must be accurately accounted for during timing analysis.

The traditional timing methodology to handle such variability is to conduct multiple static timing analyses at different "cases" or "corners" to determine the spread of performance of the circuit under these variations. Corners may include, for example, "best case," "nominal" and "worst case." Unfortunately, the traditional methodology is breaking down because the number of independent and significant sources of variation is numerous, and too many timing runs would be required. One way to combat this is to worst-case or guard-band against some sources of variation, but this causes pessimism in the performance prediction. Another way to combat the explosion of timing runs required is to skip the analysis at certain corners, but this is risky since the performance of the circuit may be unacceptable at the skipped corners and this may be manifested by chips failing on the tester or in the field. Because of these effects, traditional timing methodologies are rapidly becoming burdensome, as well as risky and pessimistic at the same time.

Moreover, for a thorough analysis, several combinations of process variations must be analyzed. For example, weak and strong drivers, thin and thick metal layers, high and low voltage supplies, and all combinations thereof should be examined for a thorough analysis. Such an exhaustive analysis, however, is inefficient.

A solution to the problems faced by traditional timing methodologies is statistical or probabilistic timing analysis. With each new generation of integrated circuit technology, variability (e.g., due to process parameters, environmental parameters and aging effects, hereinafter collectively referred to as "process parameters") is proportionately increasing. To handle this increased variability in static timing analysis (STA) efficiently and with reduced pessimism compared to corner-based (or deterministic) timing methods, statistical timing is often used. Statistical timing analysis is static timing analysis that accounts for process variation; as used herein, the terms "static timing analysis", or simply "timing analysis", are understood to include statistical timing analysis. In such an analysis, timing quantities such as delays, arrival times and slacks are not treated as single numbers, but rather as probability distributions. Thus the full probability distribution of the performance of the circuit under the influence of variations may be predicted by a single timing run. Moreover, the problems of unnecessary risk, excessive timing runs and pessimism are all potentially avoided.

In addition to accounting for variations, e.g., process variations, in a timing analysis, coupling capacitance should also be accounted for in the timing analysis. Coupling capacitance exists when two neighboring wires in an integrated circuit are in close proximity to each other. Depending on how the signals rise or fall on these wires, capacitive coupling can cause changes in the delays and slews (transition times) of gates and wires. For example, if the signals on the two neighboring wires are switching in the same direction (e.g., both rising or both falling), then the coupling capacitances between the two wires have their two terminal voltages moving in the same direction; hence the effective capacitance is reduced due to the so-called Miller effect, which causes the signals to speed up. Alternatively, if the two signals are switching in opposite directions, the effective capacitance is exacerbated, which can cause the signals to slow down. In order to accurately predict the coupling capacitance, a K-factor/Miller-cap multiplier may be determined. The Miller-cap multiplier represents the amount by which the effect of the coupling capacitance on the net increases or decreases due to switching on the net to which it is coupled. Taking into account these coupling effects is essential to correctly predict the timing characteristics of integrated circuits. Moreover, with advanced technologies, coupling between wires is increasing, since the wires in modern integrated circuit technologies are taller and thinner than ever before, and high packing densities lead to wires that are closer to each other and to a larger number of on-chip interconnections.

In addition to the drawbacks of deterministic STA due to its inability to efficiently account for, e.g., process variations in a timing analysis, there are several other drawbacks of STA with regard to accounting for coupling capacitances. For example, coupling in the form of interactions between adjacent wires causes disturbances that are not easily handled by a conventional static timing analysis. This is because static timing analysis relies on levelization of the timing graph, whereas due to coupling, gates and wires at different level numbers can impact each others' delays and slews. Although some methods are known for analyzing coupling effects in STA, these methods do not take process variations into account.

Additionally, predicting the worst-case corner (or setting of process parameters that produces the worst-case timing result) is not immediately obvious, since when process parameters vary, some of the factors described above make the coupling event worse, and some factors make it better. For example, suppose that, due to process variations, the victim driving gate strength is diminished. As a result of this variation, the victim near-end and far-end signals arrive later. One possible result is an overlapping time window between the victim and aggressor, which will make the coupling event worse. A different, but also possible, result is that there will no longer be an overlapping time window, which will make the coupling event better.

Furthermore, using a worst-case analysis is needlessly pessimistic. For example, suppose again that, due to process variations, the victim driving gate strength is diminished. As a result, the victim near-end and far-end signals arrive later, and perhaps there will be no overlapping time window between the aggressor and victim. On the other hand, if the victim driving gate is stronger, the impact of the noise coupling event will be diminished, since the strong driving gate will drive the wire in a stronger fashion. A simple worst-case analysis will not take these correlations into account and will predict a needlessly pessimistic result.

Additionally, the delays of edges in a timing graph typically reflect the delay through either a block (circuit) in the system, or from the source to a sink of a net in the system. In a system implemented with CMOS integrated circuits both of these delays will typically depend on the capacitive load on the net being driven by a block or whose delay is being computed, and on the signal slew (defined as the transition time or rise or fall time) at the source node of the edge. Traditionally, the capacitive load has been assumed to be a capacitance coupled to ground. However, in modern integrated circuits, the wires comprising the nets of the integrated circuit are physically very close together. Consequently, the coupling capacitance between the nets of the integrated circuit is often greater than the capacitance from the net to ground. Since these neighboring wires will be switching, the grounded capacitance assumption is invalid.

As a statistical static timing analysis (SSTA) is performed using K-factors to account for coupling capacitances, the K-factors may alter the SSTA, which in turn may alter the K-factors. Thus, performing an SSTA wherein the K-factors are dynamically adjusted involves an iterative process that may involve a large number of calculations. Thus, integrating the coupling iterative process within a statistical static timing analysis (SSTA) would necessitate a long processing time, and consequently, increase costs and reduce efficiency.

Accordingly, there exists a need in the art to overcome the deficiencies and limitations described hereinabove.

SUMMARY

In a first aspect of the invention, a method of performing statistical timing analysis of a logic design, including effects of signal coupling, comprises performing a deterministic analysis to determine deterministic coupling information for at least one aggressor/victim net pair of the logic design. Additionally, the method comprises performing a statistical timing analysis in which the deterministic coupling information for the at least one aggressor/victim net pair is combined with statistical values of the statistical timing analysis to determine a statistical effective capacitance of a victim of the aggressor/victim net pair. Furthermore, the method comprises using the statistical effective capacitance to determine timing data used in the statistical timing analysis.

In a further aspect of the invention, a computer program product for performing statistical timing analysis of a logic design, including effects of signal coupling, comprises a computer usable medium having readable program code tangibly embodied in the medium. The computer program product includes at least one component operable to perform a deterministic analysis to determine deterministic coupling information for at least one aggressor/victim net pair of the logic design. Further, the at least one component is operable to perform a statistical timing analysis in which the deterministic coupling information for the at least one aggressor/victim net pair is combined with statistical values of the statistical timing analysis to determine a statistical effective capacitance of a victim of the aggressor/victim net pair. Moreover, the at least one component is operable to use the statistical effective capacitance to determine timing data used in the statistical timing analysis. Additionally, the at least one component is operable to, for each block of the logic design for a predetermined set of sources of variation, determine a sensitivity of each of the predetermined set of sources of variation to each block of the logic design.

In an additional aspect of the invention, a method comprises providing a computer infrastructure operable to perform a deterministic analysis to deterministically determine coupling information for at least one aggressor/victim net pair of the logic design. Additionally, the computer infrastructure is operable to perform a statistical timing analysis in which the deterministic coupling information for the at least one aggressor/victim net pair is combined with statistical values of the statistical timing analysis to determine a statistical effective capacitance of a victim of the aggressor/victim net pair. Moreover the computer infrastructure is operable to use the statistical effective capacitance to determine timing data used in the statistical timing analysis.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to the field of design automation, and more particularly, to a method and system for analyzing cross-talk coupling noise events in a block-based statistical static timing analysis. The present invention includes a methodology that combines a deterministic coupling analysis with statistical block based timing analysis. The present invention determines equivalent statistical coupling capacitances using deterministically determined weighting K-factors.

By implementing the present invention, a method for modeling coupling induced noise events may be leveraged to include a coupling capacitance determination within a statistical static timing analysis (SSTA). The present invention provides a solution with limited loss of accuracy, and little runtime overhead. Additionally, by implementing the present invention, there is no dependency on static coupling availability. Moreover, the process variations of coupling capacitances are included in the statistical static timing analysis environment (even though K-factors may be frozen after being deterministically determined).

System Environment

Figure 1:
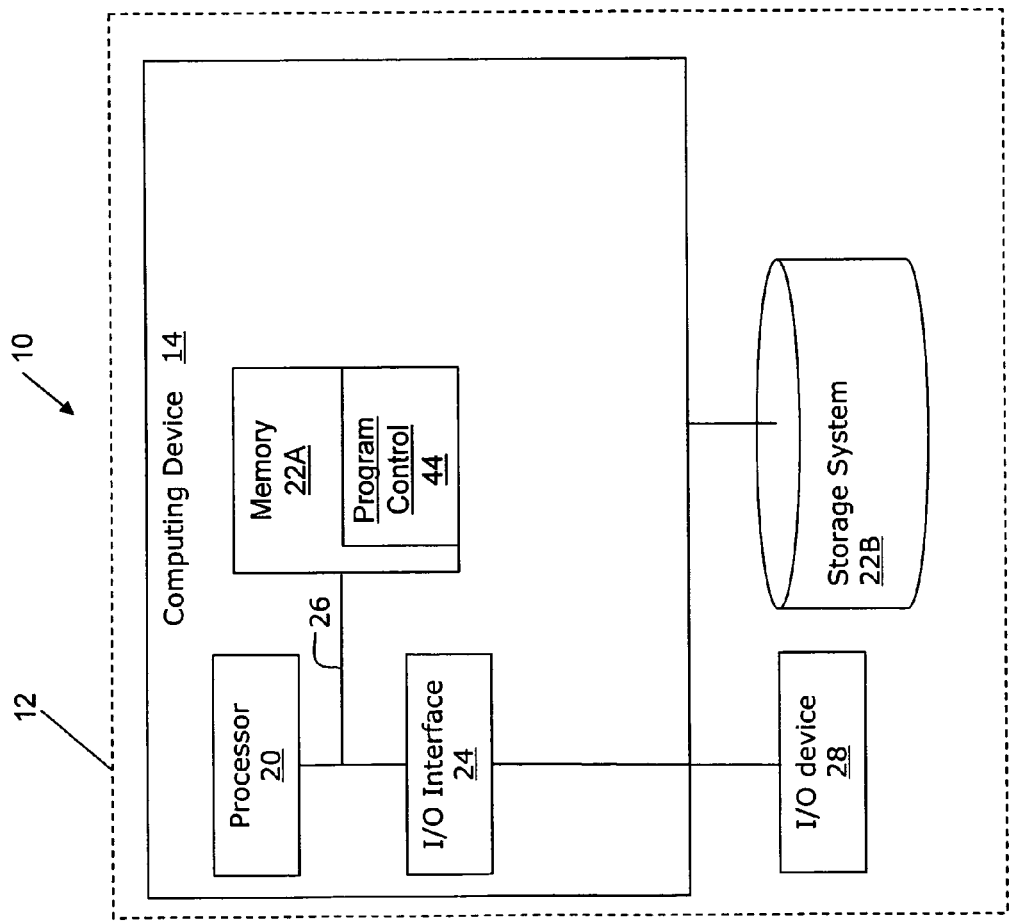
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein using a computing device 14. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28. The I/O device 28 can interact with the computing device 14 or any device that enables the computing device 14 to communicate with one or more other computing devices using any type of communications link. The external I/O device/resource 28 may be keyboards, displays, pointing devices, etc. Additionally, in embodiments, the computing device 14 includes a storage system 22B.

The processor 20 executes computer program code (e.g., program control 44) processes on computer media, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Coupling Event

Figure 2:
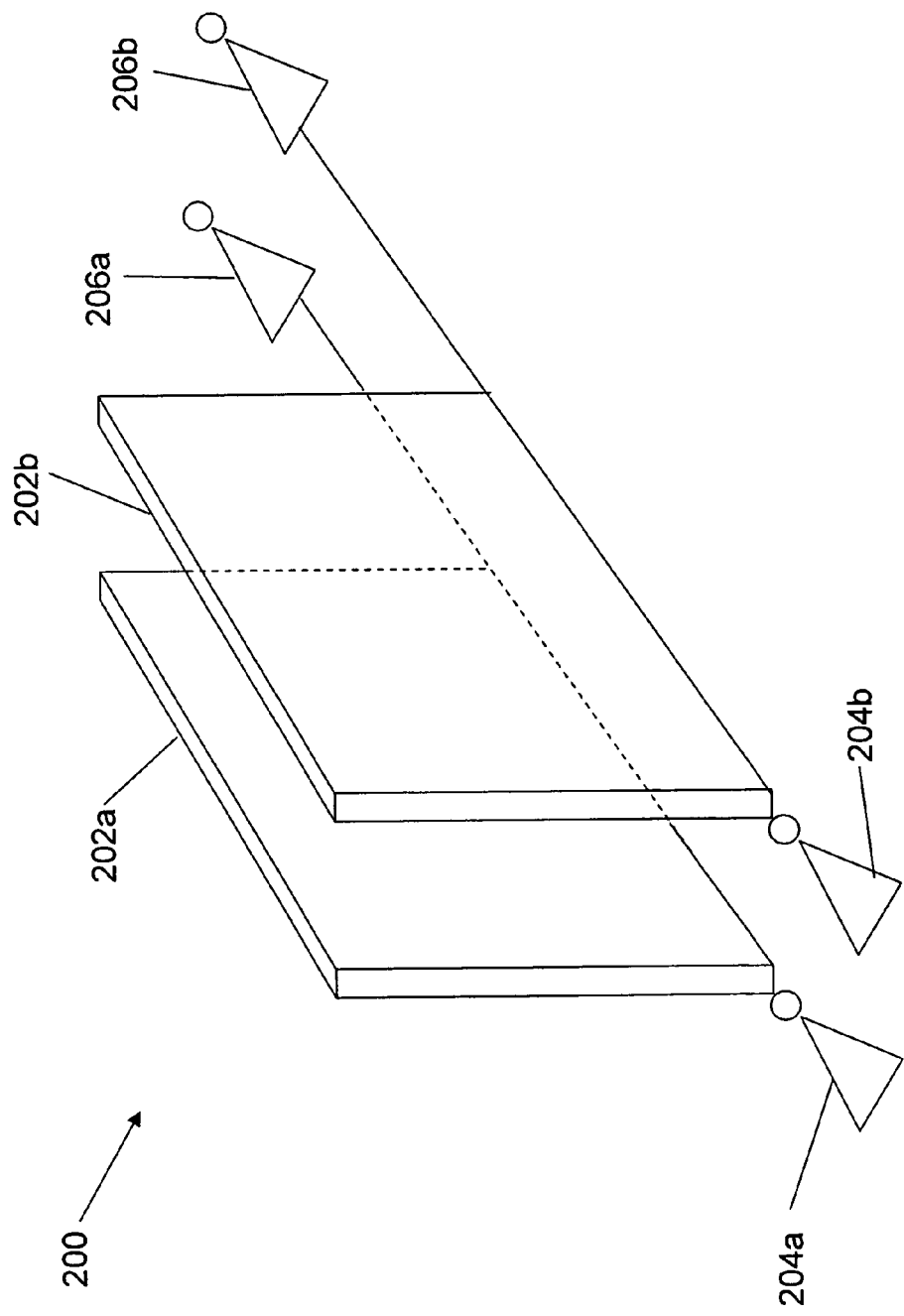
FIG. 2 is an exemplary schematic diagram illustrating an exemplary coupling event.

FIG. 2 shows an exemplary schematic diagram illustrating an exemplary coupling event 200. As illustrated, first and second neighboring wires (or nets) 202a and 202b on a chip have coupling between them. A signal on the first wire 202a is driven by a first gate 204a and received by a second gate 206a. The second wire 202b is driven by a third gate 204b and received by a fourth gate 206b. When the signals driven through two neighboring wires, such as the first wire 202a and the second wire 202b, switch during the same time window, this is referred to as a coupling event.

The wire at which a signal is being analyzed for timing is referred to as the "victim," while the wire with which the victim experiences a coupling event is referred to as the "aggressor." Thus, for example, to determine the timing of the signal driven along the first wire 202a, then the first wire 202a is the victim, and the second wire 202b is the aggressor. The signal at the output of the first gate 204a is called the near-end victim signal and the signal at the input of the second gate 206a is called the far-end victim signal. Likewise, the signal at the output of the third gate 204b is called the near-end aggressor signal and the signal at the input of the receiver fourth gate 206b is called the far-end aggressor signal. If the signal driven through the aggressor switches contemporaneously and in the same direction as the signal driven through the victim, then the transmission of the signal on the victim will be sped up. Alternatively, if the signal driven through the aggressor switches contemporaneously and in the opposite direction of the signal driven through the victim, then the transmission of the signal through the victim will be slowed down.

Figure 3:
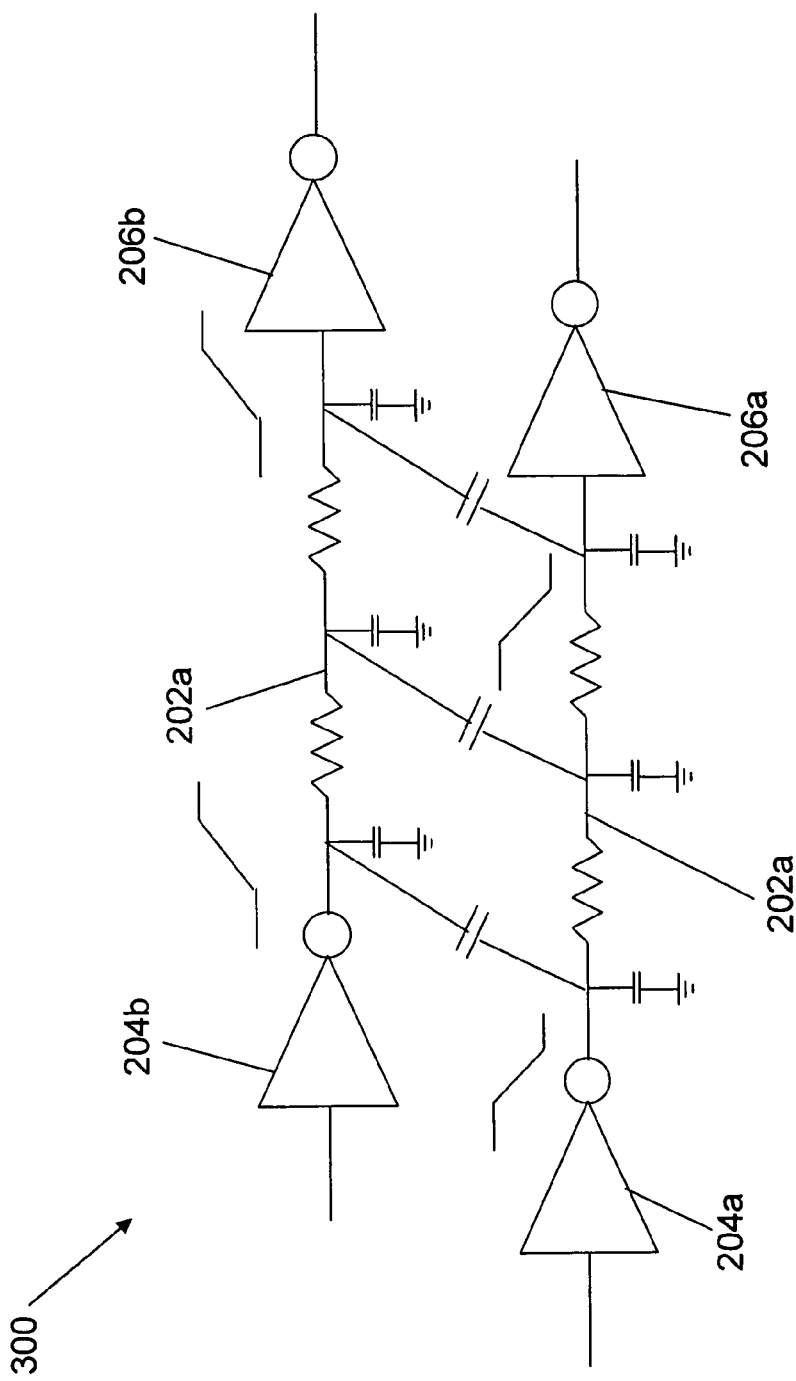
FIG. 3 illustrates an electrical equivalent circuit for the exemplary coupling event illustrated in FIG. 2.

FIG. 3 illustrates an electrical equivalent circuit 300 for the exemplary coupling event illustrated in FIG. 2. The first and second wires 202a and 202b have been modeled by resistance and capacitance (RC) parasitics, typically produced from the layout of the integrated circuit by an extraction program. Four factors may influence the change of delay due to a coupling event. The first factor is whether or not the two signals at the two terminals of any of the coupling capacitances overlap (i.e., can the signals transition contemporaneously or during the same window of time), as well as the amount of time during which the signals can overlap. The second factor is the amount of coupling capacitance. The third factor is the transition time or slew of signals at the aggressor near-end, aggressor far-end, victim near-end and victim far-end. Finally, the fourth factor is the strength of the victim and the strength of the aggressor, which includes the sizes of the driving gates (e.g., first and third gates 204a and 204b) and the power supply voltage swings of the victim and aggressor driver gates (e.g., first and third gates 204a and 204b).

Flow Diagram

Figure 4:
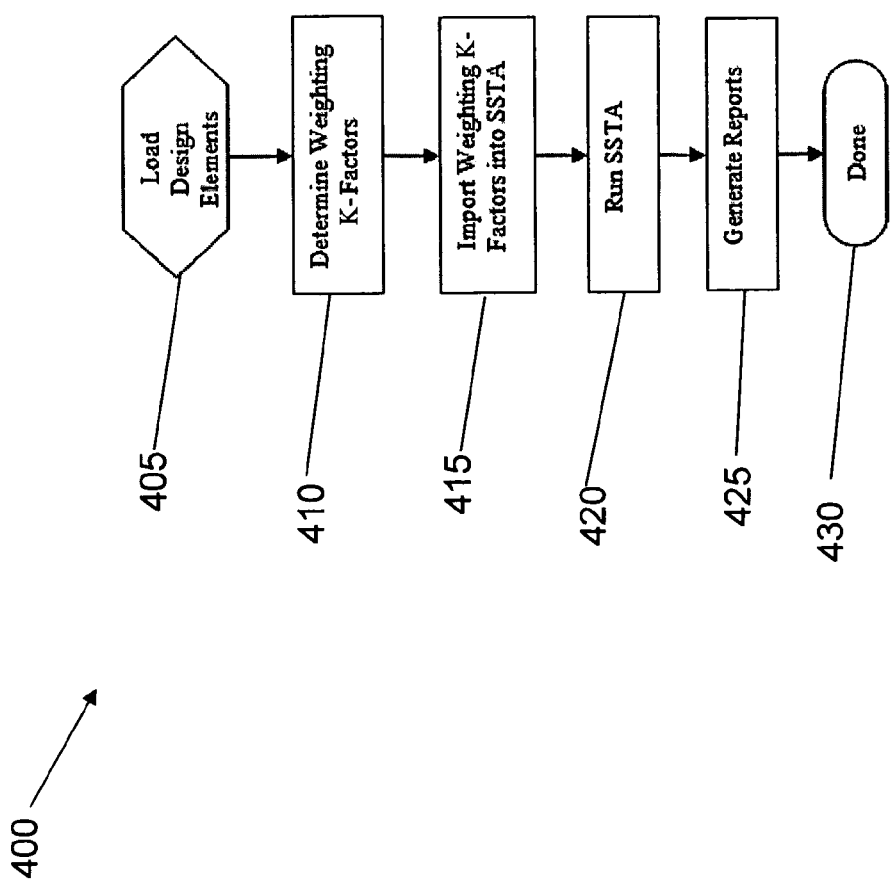
FIGS. 4-6 show exemplary flow diagrams for performing aspects of the present invention.
Figure 5:
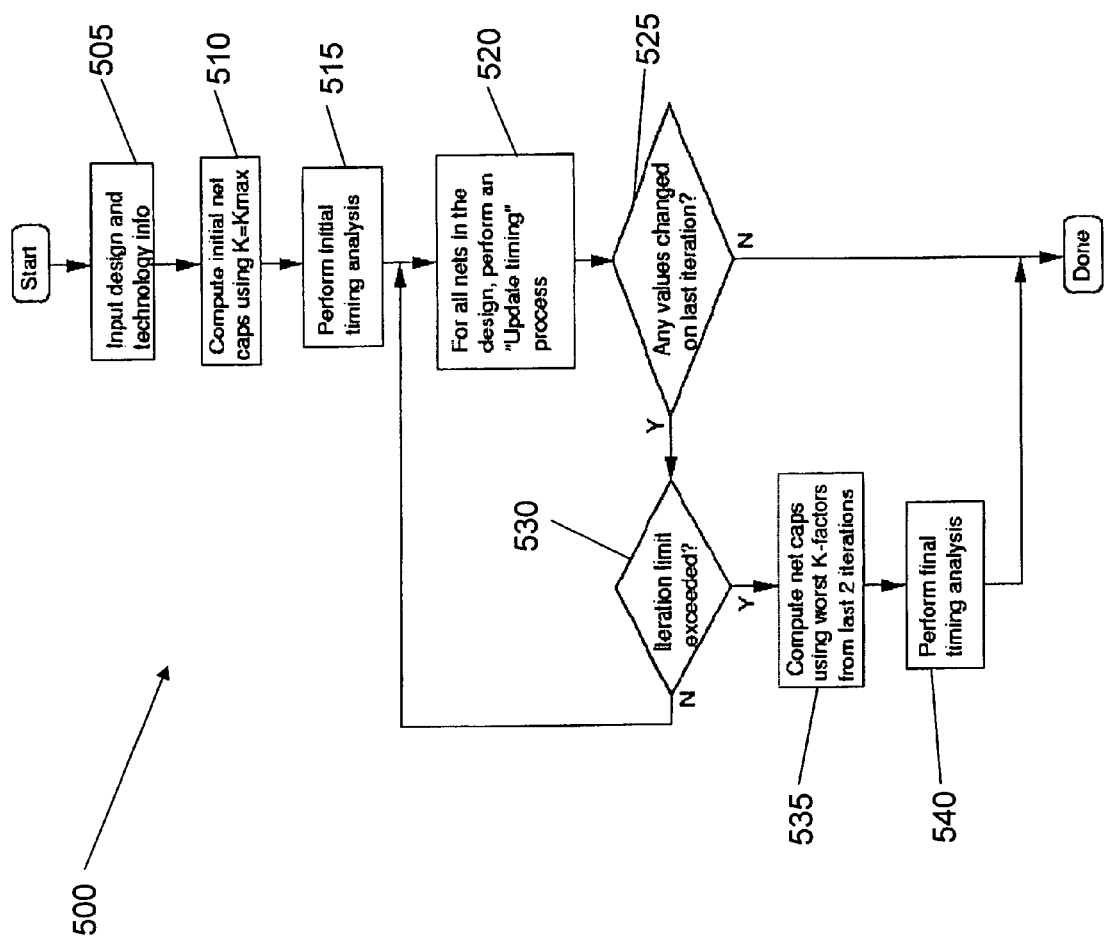
Figure 6:
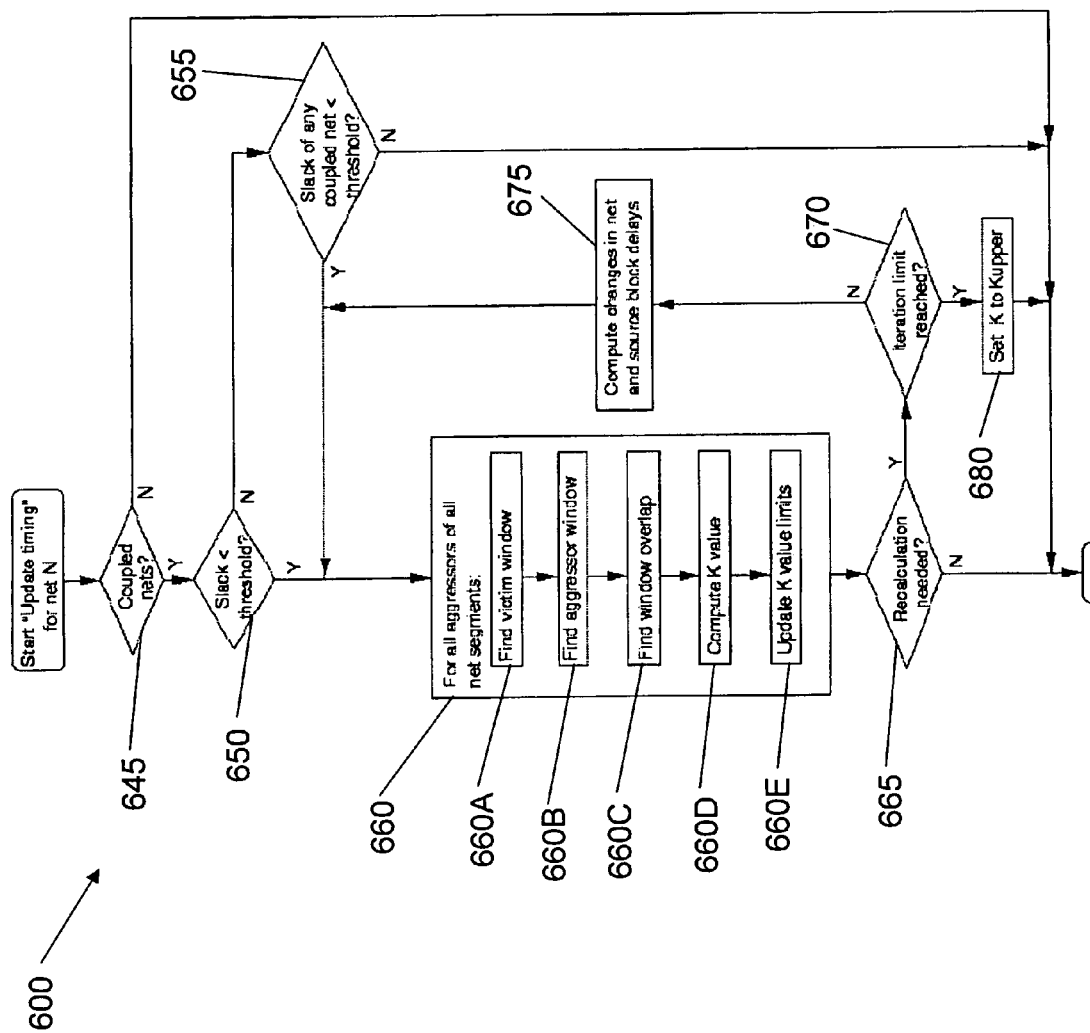

FIGS. 4-6 show an exemplary flow diagrams for performing steps of the invention. The steps of the flow diagrams described herein may be implemented in the environment of FIG. 1. The flow diagrams may equally represent high-level block diagrams of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As discussed above, FIG. 4 shows an exemplary flow 400 for performing steps of the invention. The flow 400 may be implemented to analyze both combinational and sequential integrated circuit designs. As will be described in further detail below, the flow 400 accurately and efficiently accounts for both process variations and coupling events during a statistical static timing analysis, while also taking into account the complex correlations induced by process variations.

At step 405, the design and related technology information of the circuit are loaded (e.g., delay rules, capacitance and resistance per unit length, etc.). The design input generally includes a complete electrical schematic showing the detailed parasitic capacitance and resistance (at least on those nets which exhibit significant coupling). At step 410, the K-factors are determined. At step 415, the determined K-factors are imported into a statistical static timing analysis (SSTA). At step 420, the SSTA is performed. At step 425, reports are generated. At step 430, the process ends.

It should be understood, that while the steps have been described as occurring in a particular order, the invention contemplates that the steps may be performed in other orders. Furthermore, the invention contemplates that, in embodiments, steps may be implied or omitted while still remaining true to this invention.

Weighting Factor Determination

According to an aspect of the invention, multiplier/weighting K-factors may be determined with deterministic (single corner) timing. The K-factor represents the factor by which the effect of the coupling capacitance on the net increases or decreases due to switching on the net to which it is coupled. Moreover, the K-factors provide a measure of the possibility of a switching event between the aggressor and victim net. Timing windows that describe the victim and aggressor switching activity as well as transition timing (slew) are used to determine the K-factor.

The method described herein finds an equivalent static (or grounded) capacitance for each coupling capacitance based on the slew of the victim (defined as a net whose delay is affected) and the aggressor (defined as a net whose switching affects the victim delay), and also on the times during which these nets are switching (arrival time windows). The aggressor arrival time window includes the entire time from the early mode arrival time to the late mode arrival time during which the aggressor net could be switching. The victim arrival time window includes the time during which the victim net is making a particular transition, thus separate early and late mode victim arrival time windows are employed to compute the early and late mode equivalent static capacitances and delays, respectively. In embodiments, the analysis starts out assuming worst case coupling impacts and iterates to reduce the pessimism until convergence is achieved or some iteration limit is reached.

In the decreasing pessimism embodiment, the sizes of the aggressor arrival time windows decrease during successive iterations, thus reducing pessimism. However, there are circumstances in which the pessimism may temporarily increase. It is assumed that in the course of some iteration, an aggressor net whose late mode arrival time occurs just after the late mode arrival time of a victim net, and whose late mode arrival time is adjusted during this iteration, will occur just prior to the late mode arrival time of the victim. The late mode arrival time of the victim will also go down since it was slowed by the aggressor in the previous iteration (due to the timing window overlap) but it is not slowed down by it during the present iteration. This reduction in the victim's late mode arrival time may cause it to become less than the aggressor's (or some other potential aggressor's) late mode arrival time. This may in turn increase the effect of the aggressor on the victim, increasing the victim's late mode arrival time and thereby increasing its arrival time window when viewed as an aggressor to some other net.

The extra iteration described herein attempts to minimize this impact. However, once the property of strictly decreasing pessimism is lost, it may no longer be possible to ensure that the final result is not optimistic. To avoid this problem it is possible to detect cases where an arrival time is adjusted in such a way that it is moved out of the aggressor windows of other adjacent nets. In these cases, it is possible to perform a local iteration to determine arrival time and slew values which are not overly optimistic given the current arrival time windows of all the aggressors. This only needs to be done in cases wherein the aggressor/victim overlap window decreases for some aggressor of the victim being adjusted.

Those of skill in the art will readily recognize that the update of the effective equivalent grounded capacitance of any net only needs to be updated when the overlap between arrival time windows of that net and of some aggressor net has changed during the last iteration or when the slew of the victim (or of an aggressor) was modified in the last iteration. This further reduces the iteration cost. In order to further reduce the run time, in embodiments, it is advantageous to only process those coupled nets which have a slack below a certain specified threshold. The decreasing pessimism nature of the approach makes a slack based cut-off criteria feasible. In addition, it is possible to restrict further processing in the current iteration to those nets whose capacitance value changes exceed a user specified value. This combined with a user specified maximum iteration limit helps trade accuracy for speed and vice-versa.

The invention further assumes that all aggressor nets switch in the same direction as the victim when computing a new early mode equivalent static capacitance for the victim and that all aggressor nets switch in the opposite direction as the victim when computing a new late mode equivalent static capacitance for the victim. The early mode equivalent static capacitance value is then used to compute a new early mode slew. When this victim net is considered as an aggressor to some other net, this early mode slew is used in computing both the early and late mode new equivalent static capacitance on the victim net. For late mode analysis of this second victim net, the assumption is made that the victim and aggressor make transitions in opposite directions.

By way of example, let a pair of nets A and B be considered, each of which is to be treated as an aggressor toward the other. An early mode slew on A is computed assuming that B switches in the same direction. Then this early mode slew is used to compute the late mode information on B, assuming that A and B switch in opposite directions. These two assumptions are inconsistent with each other, and further, they introduce pessimism. To avoid this pessimism, a separate early mode slew is computed on each aggressor with respect to each of its victims, assuming that the victim is switching in the opposite direction, but that all other aggressors to the aggressor are switching in the same direction. This is more expensive because it requires computing multiple slews for each aggressor; thus, this extra step is to be performed only on nets which still have a slack below the slack threshold value after the simpler iteration.

The normal static timing formulation will be used in which a delay graph is derived from or implied by the circuit schematic including delay arcs between block inputs and outputs and between net sources and sinks. The late mode arrival time (AT) at a node is the maximum over all incoming arcs of the late mode AT at the source of the arc added to the delay of the arc. The early mode AT is the minimum over all incoming arcs of the early mode AT at the source of the arc added to the delay of the arc. The late mode required arrival time (RAT) at a node is the minimum over all outgoing arcs of the late mode RAT at the sink of the arc minus the delay of the arc. Late mode slack at a node is defined as RAT-AT, while an early mode slack is defined as AT-RAT. This implies that a negative slack always indicates the failure to meet the timing requirements of the design. The early mode RAT is the maximum over all outgoing arcs of the early mode RAT at the sink of the arc minus the delay of the arc. A more complete timing model may include test arcs, but these are not necessary for the understanding of the invention and will be omitted from this discussion.

Referring to the flow diagram of FIG. 5, the method begins with step 505 by inputting a design and related technology information (e.g., delay rules, capacitance and resistance per unit length, etc.). The design input generally includes of a complete electrical schematic showing the detailed parasitic capacitance and resistance (at least on those nets which exhibit significant coupling). However, it may only include lumped net capacitances and RC values based on the "A=Amax" assumption (described below). In this case, an additional system (not shown) may be provided to extract detailed coupling parasitic information when needed. The method of the invention proceeds with step 510 by computing equivalent grounded segment capacitances for all the net segments exhibiting coupling, assuming worst case aggressor conditions. This condition is reflected by a K-factor computed using Amax. The K-factor represents the factor by which the effect of the coupling capacitance on the net increases or decreases due to switching on the net to which it is coupled. It is chosen so that the total charge needed to change the voltage on the equivalent grounded capacitance equals the actual charge required to change the voltage on the net in the presence of switching on an adjacent net. The victim net sees a voltage change equal to the power supply voltage (Vdd), so given a charge Q implies an equivalent grounded capacitance of Vdd/Q (from the definition of capacitance). The actual voltage change across the coupling capacitance is Vdd±the change in voltage on the aggressor.

This voltage in turn depends on how much of the transition on the aggressor can occur during the transition on the victim. If, for example, delays on the victim are measured at the 50% crossing point, one may be only interested in the voltage change on the aggressor occurring during the first half of the victim transition which is then added to a voltage change of Vdd/2 (the amount the victim net changes up to the 50% measurement point). If the aggressor transition is longer than the victim's transition and the arrival time windows overlap completely, the voltage change on the aggressor (assuming a trapezoidal waveform approximation) will be slew (victim)/slew (aggressor). The early mode slew of the aggressor net is used because this presents the largest possible impact on the victim net, thus ensuring that the timing results present safe bounds on the actual circuit behavior. When the arrival time windows do not completely overlap one must consider the different degrees of possible overlap between aggressor and victim transitions, determined by the overlap between their arrival time windows. In this case, the interaction period (IP) between the waveforms (the maximum amount of time during which the aggressor transition could be affecting the victim) is given by:

$$IP=\min(\text{slew(victim)},\text{slew(aggressor)},\text{overlap}) \quad (1)$$

To computing K-factors, a coupling capacitance adder factor A is first computed:

$$A=\{IP/\text{slew(aggressor)}\}*\min\{A\max,\text{slew(victim)}/IP\}*\{\text{voltage(aggressor)}/\text{voltage(victim)}\} \quad (2)$$

K factors are then computed as:

$$K=1+A, \text{ for late mode,} \quad (3)$$

and $$K=1-A, \text{ for early mode.} \quad (4)$$

For the initial calculation the slews on the nets are not known, nor the ATs which control the amount of possible overlap. Thus, a worst case value of Amax is used, which assumes a complete overlap of windows. The value of Amax depends on an analysis and judgment as to what is the maximum amount by which a coupling capacitance can be magnified or masked due to switching taking place on an aggressor net. It may depend on the way how delays and slews are measured. Typically, a maximum A value of 1 is used, producing K-factors of 2 for late mode and 0 for early mode, and indicating that the aggressor switching can completely mask the coupling capacitance in early mode, and can double the coupling capacitance in a late mode. However, it should be understood that other values for a maximum K-factor may be used. For example, in embodiments, a maximum A value of 2 may be used, giving K-factors of 3 for late mode and −1 for early mode. The equivalent total grounded capacitance Ct for each victim net segment is then computed as:

$$Ct=Cg+K*Cc, \text{ for both the early mode and the late mode,} \quad (5)$$

wherein Cg is the actual capacitance-to-ground for the segment and Cc is the coupling capacitance for that segment.

These capacitance values are then used in step 515 to compute delays used in a conventional static timing analysis. In step 520, each net in the design is examined, followed by an update of the delays and of the timing analysis due to the effects of coupling on that net (described in detail below). In step 525, it is determined whether the last loop through the nets of the design resulted in any changes in timing values (due to changes in K-factors). If no change occurred, the process is deemed complete.

If the last iteration caused changes, the process continues to step 530, wherein it is determined whether or not some user-specified limit on the number of iterations has been exceeded. If, at step 530, it is determined that the user-specified limit on the number of iterations has not been exceeded, the process continues to step 520, to again update the timing analysis based on coupling information. If the iteration limit has been exceeded, a final timing analysis may be needed to prevent optimistic results from being reported. This is accomplished by steps 535 and 540.

In embodiments, these steps may be omitted if the method used to update the timing analysis is guaranteed not to introduce any optimism. Since any method set to guarantee this property is more expensive than one which does not, it may be preferable to perform instead steps 535 and 540 to eliminate this pessimism and to compute equivalent grounded capacitance values for all net segments based on these K-factors. This is accomplished in step 535, choosing for each coupling capacitance the K-factors derived from the most pessimistic (largest) A value of those found during the last two iterations through step 520. These K-factors are selected because the predominant form of optimism that may be introduced is due to an "overshoot" in the reduction of the A value for a coupling capacitance.

The "overshoot" can occur if an improvement on the victim delay increases the degree of overlap between the victim and aggressor windows (explained hereinafter). The increase in one iteration can cause the A value for the coupling capacitance to be too low, because it is based on too small an overlap value. This overshoot is normally corrected during the subsequent iteration. Thus, by choosing the larger of the last two A values, choosing an A value which is too low due to the undershoot phenomenon may be avoided. The capacitances computed using K-factors computed from this A factor are then used in step 540 to perform a final update to the delay calculation and timing analysis.

FIG. 6 shows an exemplary flow diagram 600 illustrating details of the process of updating the timing due to the effects of a coupling on a particular net N. The process is initiated at step 645 by determining whether any of the segments of net N exhibit coupling. If not, the net N capacitance needs no adjustment and the process stops. If net N exhibits coupling, it is determined in step 650 whether its slack (more specifically, the slack of any of its pins) is less than some user specified threshold (e.g., typically 0 if attempting to determine whether any timing violation exists). If the slack is below the threshold or, as determined in step 655, the slack of some net V coupled to the selected net is below the threshold, a branch to steps 660 through 670 follows to update the timing due to coupling on net N.

In embodiments, step 655 may be omitted at the possible cost of excess pessimism in the timing results. This can occur, for example, if net N is an aggressor to a critical net V (defined as a net which slack is below the threshold) and an adjustment to the timing of net N reduces the aggressor window of net N with respect to net V in a way that improves the timing of net V. This can be carried further by considering whether any chain of nets $X_1 \ldots X_m$ exists such that net N couples to net X1, net $X_i$ couples to net $X_{i+}$, and net $X_m$ couples to critical net V. However, such an extension (not shown above) may generally increase the run time of the analysis with little benefit in reduced pessimism.

In step 660, all segments S of net N are examined, the segment capacitance is updated, and these newly obtained capacitances are used to further update the delays affected by these capacitance changes and, subsequently, the timing analysis. In sub-step 660A, the victim window for the selected net is found. In embodiments, four separate victim windows are selected for the late and early modes rising and falling delays. In each case, the start of the window is the AT of the selected transition at the source pin of the net minus one-half the slew associated with that AT. The end of the victim window is the maximum over all net sinks of the AT of the selected transition at the sink plus one-half the slew associated with that AT.

Variations in these victim arrival time windows are possible. If, for example, the victim delay of interest is the time it takes for a signal on the victim net to reach the midpoint between the power supply voltage (Vdd) and ground, only the interactions during the first half of the signal transition are of interest. In this case, the endpoint of the victim arrival time window may instead be defined as simply the arrival time of the signal.

In sub-step 660B, the aggressor arrival time window is determined for each aggressor net segment A exhibiting coupling to net segment S. In embodiments, only two aggressor arrival time windows are found, i.e., for rising and falling transitions. The start of the aggressor arrival time window is the early mode AT for the transition at the aggressor net source minus one-half the early mode slew associated with that AT. The end of the aggressor arrival time window is the maximum over all the sinks of the aggressor net fed through segment A of the late mode AT for the transition at the sink plus one-half the late mode slew associated with that AT.

In sub-step 660C, a comparison is made between the aggressor and the victim arrival time windows as well as a determination of their degree of overlap. This comparison should take into account any differences in the time base and frequency of the signals on the two nets. For the late mode K-factor, the aggressor transition chosen is the opposite of the victim transition being considered, (e.g., choosing a rising aggressor for a falling victim) while for an early mode, the transition chosen is the same as the victim transition. The K-factor used to determine the effect of this aggressor segment on the coupling capacitance is then determined in step 660D using equation (2) as set forth above.

Equation (2) can be understood as follows. IP is the interaction period of the two waveforms. So, the first ratio (IP/slew(aggressor)) is the maximum fraction of Vdd through which the aggressor can make a transition while affecting the victim. This ratio is always less or equal to 1. The inverse of the second ratio (IP/slew(victim)) is the maximum portion of the victim transition which can be affected by the victim, and is also equal to the maximum fraction of Vdd through which the victim can transition while being affected by the victim. 1/Amax acts as a bound on this victim sensitivity period. For example, if Amax=2, then one would allow the full impact of an aggressor to be felt during the first half of the victim transition. Alternatively, even if the aggressor impacts the victim during a very small period of time, when computing an equivalent grounded capacitance its effects over at least 1/Amax of the victim transition are then spread. Thus, the ratio to Amax should be limited. The first ratio (IP/slew(aggressor)) is therefore an aggressor change in voltage ($\Delta Va$) and the second term (min {Amax, slew(victim)/IP}) is the inverse of a victim change in voltage ($\Delta Vv$) during which it is sensitive to the aggressor. The equivalent grounded capacitance is computed by first determining the amount of charge required to charge the coupling capacitance with both the victim and aggressor switching, and then finding the capacitance which would require that same amount of charge to charge if only the victim were switching. Thus, $$Q=Cc(\Delta Vv \pm \Delta Va)=Ceq(\Delta Vv), \text{ and} \quad (6)$$

$$Ceq=Cc(\Delta Vv \pm \Delta Va)/\Delta Vv=Cc(1 \pm K) \quad (7)$$

Therefore $A=\Delta Va/\Delta Vv$, yielding equation (2) for A given above.

If the local iterations steps 665, 670, 675, and 680 (explained below) are implemented, in step 660E, the largest and smallest A values found for each aggressor of net N during the local set of iterations, as $A_{upper}$ and $A_{lower}$, initialized to $+\infty$ and $-\infty$, respectively should be tracked (e.g., in the storage system 22B of FIG. 1). Consider, for example, during a particular local iteration, the calculation of a new A value, $A_{new}$, to replace a A value, $A_{old}$, which was computed in the previous iteration. If $A_{new}>A_{upper}$ or $A_{new}<A_{lower}$, it is replaced with some value between $A_{lower}$ and $A_{upper}$, typically $A_{new}=(A_{lower}+A_{upper})/2$. After finding $A_{new}$, if $A_{new}<A_{old}$, then $A_{upper}=\min(A_{upper}, A_{old})$. If $A_{new}>A_{old}$, then $A_{lower}=\max(A_{lower}, A_{old})$.

In embodiments, all the slew-dependent computations described above may be modified slightly to account for the exact definition of slew being used. For example, if slew is defined as the time it takes for the signal to move from 20% to 80% of its final value, the slews may be divided by 0.6 before using them, in order to include the (trapezoidally extrapolated) full transition event. These adjustments cancel out when taking the ratio of two slews, but may affect the overlap computation in a way that should be accounted for.

Additionally, the aggressor arrival time windows may be extended somewhat to account for the recovery time of a victim net when an aggressor switches just before the victim starts its transition. Such an extension occurs on the positive end of (i.e., after) the aggressor arrival time window. One method for determining how much the arrival time window should be extended, for example, may use a capacitive divider equation to determine the size of the noise pulse that the aggressor could induce on the 'quiet' victim, and then use the victim slew to determine how long it takes for the victim to recover from that noise pulse. The noise pulse size (defined as a fraction of Vdd) will then be the coupling capacitance to the aggressor divided by the total (grounded+coupling) capacitance of the victim net. The aggressor arrival time window may be expanded by this fraction of the late mode victim slew.

An alternative approach is to compute (in step 660A) only two victim arrival time windows (rising and falling) in the same manner as used for the aggressor arrival time window. This ensures that the process of updating the timing for net N does not produce optimistic results, thus obviating the need for steps 535 and 540 in the flow diagram 500 of FIG. 5. This approach can be pessimistic, however, causing much larger arrival time window overlaps (in step 660C) than necessary.

Another alternative is to provide segmented aggressor arrival time windows. This requires that the timing analysis propagate multiple early/late arrival time pairs associated with different subsets of the paths feeding a net. This provides a refinement to the range of times during which the aggressor may be switching, and hence it may affect the victim. Still another alternative (which may be combined with the partitioned aggressor arrival time windows) is to associate some logical information with the arrival time windows to determine the conditions under which the aggressor and victim may switch. In this case, the comparison of arrival time windows also includes a check to determine whether the victim and aggressor may logically switch together, thus further reducing the conditions under which the aggressor's switching affects the victim.

After finding (in step 660) all the K-factors for all coupling capacitances to net N, at steps 665 through 680 a determination may be made as to whether a local iteration is needed and, if so, performed. These steps constitute a second approach which may ensure that the update timing process for a net does not introduce optimism, and thus obviates the need for steps 535 and 540 in the flow diagram of FIG. 5. This is an alternative to the case of the wider victim arrival time window described above, both of which are not used together.

Specifically, in step 665, it is determined whether the change of K-factor causes a change in equivalent static capacitance and consequent net and block delays which cause the victim arrival time window to increase its overlap with any potential aggressor arrival time window. This check should, preferably, include aggressor arrival time windows with which the victim arrival time window does not currently overlap. In this case, a recalculation may be required, in which instance the process continues to step 670. Additionally, the process may proceed to step 670 for possible further local iterations if the change in K-factor causes a change in equivalent static capacitance and consequent net and block delays and slews which causes the victim arrival time window to decrease its overlap with any potential aggressor arrival time window. In this case, further local iteration is not required to ensure that the analysis is not optimistic, but it may produce a more accurate (less pessimistic) K-factor.

In step 670, it is determined whether the iteration limit has been reached. Note that this iteration limit is, in general, different from that used in step 530 of the flow diagram of FIG. 5. If the iteration limit is not reached, then the process continues to step 675, which updates the capacitances derived from the new K-factors which are used to compute new delays and slews for the net and its source block. Even though the updated values for net N may affect the aggressor arrival time window (if there is a path from net N to the aggressor net), it is not required to propagate timing changes beyond net N. This is because the aggressor arrival time window can only be reduced by such propagation, and hence will remain a pessimistic bound on the real aggressor arrival time window. By deferring the propagation of these timing values, the timing analysis process may be accelerated. The then process continues to step 660, again updating the K-factors for the coupling capacitances on the net. If, at step 665, the iteration limit has been reached, the process continues at step 680, wherein the K-factor is computed using the $A_{upper}$ value maintained in step 660E. This ends the processing of this net.

In embodiments, as an alternative to limiting a number of iterations to a predetermined number or in addition to limiting a number of iterations to a predetermined number, the invention may monitor a ΔK-factor and determine whether to perform an additional iteration based on a percentage of change of the K-factor. For example, the invention may be configured to iterate until a percentage of change of the K-factor is less than, e.g., five percent. Thus, with a given iteration, if a K-factor has changed by eight percent, then with the above exemplary embodiment, another iteration would be performed. In contrast, if, with a given iteration, the K-factor has changed by only three percent, than with the above exemplary embodiment, a further iteration would not be performed.

After determining all the pairs of K-factors for all coupling capacitances of the design (e.g., after performing the predetermined number of iterations) the K-factors may be "frozen" for use in for the statistical static timing analysis.

Statistical Static Timing Analysis

According to a further aspect of the invention, a statistical static timing analysis may be performed using the deterministically determined weighting K-factors. Statistical static timing analysis (SSTA) models an entire process space for all specified sources of variation. The "frozen" coupling weighting K-factors may be used to import coupling switching behavior within the SSTA. Furthermore, even though the K-factors were deterministically determined, according to an aspect of the invention, an effective statistical coupling capacitance may be determined by adjusting the SSTA determined statistical coupling capacitances using the deterministically determined K-factors. That is, even though the K-factor may be "frozen" and not statistically-determined, the un-adjusted coupling capacitance is a statistical determination. By multiplying the un-adjusted statistical coupling capacitance by the "frozen" K-factor, an effective statistical coupling capacitance may be determined without statistically determining the K-factors.

For example, as metal layer-to-layer process variation is modeled, the capacitance can change as wire dimensions change during the process. According to an aspect of the invention, the weighting factor will additionally scale the changed capacitance. The net effect is that circuit and net delay will change due to coupling capacitance and process variation.

In embodiments, the weighting K-factors may be imported into the SSTA, for example, through a file I/O. Alternatively, the weighting K-factors may be imported into the SSTA using an in-core memory.

In embodiments, the statistical timing analysis is performed in accordance with any of one or more of a number of known methods for statistical timing analysis, however, using the deterministically determined K-factors. More specifically, according to aspects of the invention, with each block for a given set of sources of variation (e.g., metal layer three), a sensitivity of the source of variation to that block may be determined. For example, a delay may be calculated for a thick portion of metal layer three and a delay may be calculated for a thin portion of metal layer three. As should be understood, these delays may be calculated using the determined K-factors to account for the coupling capacitance. That is, the K-factors change the load and the effective capacitance. From these calculations, a change of delay and a standard deviation may be determined, indicating a sensitivity of the source of variation to that block.

Furthermore, the sensitivities may be determined for all variation parameters (e.g., metal layer thicknesses, voltages and temperatures, amongst other parameters). More specifically, a delay would be determined for each end of the parameter range. For example, if the parameter is voltage, then a delay would be determined using SSTA and the K-factors when the voltage is high and when the voltage is low. Thus, according to an aspect of the invention, the SSTA models an entire process space for all specified sources of variation while accounting for coupling switching behavior within the SSTA, by importing the deterministically determined weighting K-factors.

Figure 7:
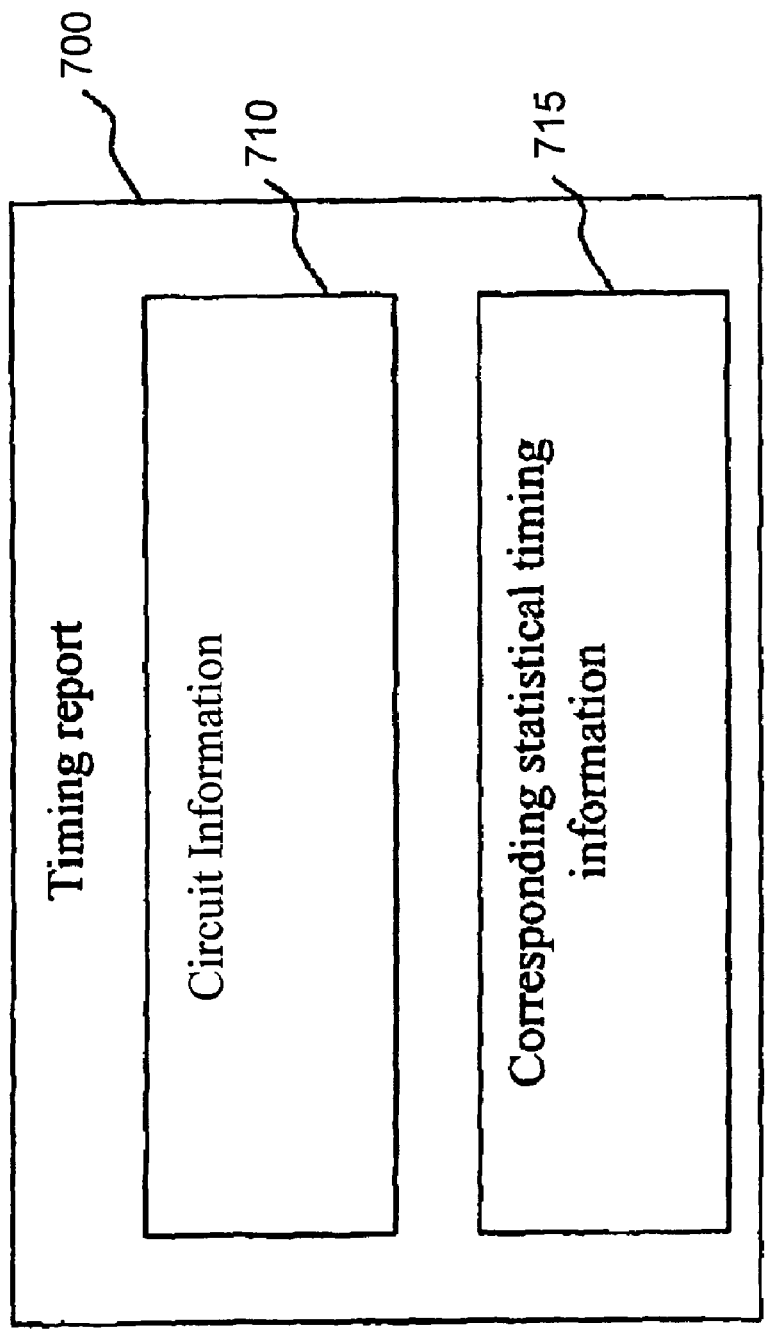
FIG. 7 illustrates an exemplary timing report in accordance with aspects of the invention.

FIG. 7 illustrates an exemplary timing report 700 according to an aspect of the invention. After SSTA completes, timing reports 700 may be generated which show coupling effects and process variation effects within the netlist. Timing reports 700 may be communicated to the user either by a programming interface, or via a hard disk file or files. An exemplary timing report 700 may include some circuit information 710 and the corresponding statistical timing information 715.

Circuit information 710 can include a list of gates, components and wires; a list of paths; a list of nodes; a list of sequential elements; a list of end points (primary outputs and timing tests); and/or a list of clock phases, amongst other circuit information. These items can be sorted and filtered in various ways to make the timing report 700 intuitive and productive to the reader of the timing report 700.

The corresponding statistical timing information 715, in the case of a node, may include, for example, one or more of the node's statistical arrival time, statistical required arrival time, statistical slew or statistical slack. For a timing test or primary output, the corresponding statistical timing information 715 may include the probability that the timing test is met, or the primary output meets its required arrival time, respectively. For a path, the corresponding statistical timing information 715 may include the statistical path slack and statistical arrival time, required arrival time, slew and slack of its end point.

Further, each statistical timing quantity in the timing report 700 can be represented in various forms, including a mean value and standard deviation; a mean value, independent random part and a correlated part; a graphical display of the distribution of the timing quantity; or sensitivities to individual global sources of variation. Further, given any two statistical timing quantities, the timing report 700 may include the correlation coefficient of the two quantities, the covariance matrix of the two quantities, and the probability that one is larger or smaller than the other. It is to be understood that each of the timing quantities in the above description can be one of an early-mode or late-mode timing quantity; one of a rising or falling timing quantity; and a timing quantity that is specific to a particular phase of a particular clock. It is to be further understood that once the statistical timing analysis is completed, these results can be reported in a variety of useful ways.

Other Embodiments

In further embodiments, instead of initially determining K-factors, the system of the invention may determine the aggressor/victim overlap window information. This aggressor/victim overlap window information may then be used with the statistical slews to generate statistically appropriate K-factors. Further, the generated statistically appropriate K-factors may be combined with the statistical coupling capacitances to determine a statistically appropriate effective capacitance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of performing statistical timing analysis of a logic design, including effects of signal coupling, the method comprising the steps of:
    performing a deterministic analysis using a processor to determine deterministic coupling information for at least one aggressor/victim net pair of the logic design exhibiting coupling, assuming worst case aggressor conditions;
    performing a statistical timing analysis in which the deterministic coupling information for the at least one aggressor/victim net pair is combined with statistical values of the statistical timing analysis to determine a statistical effective capacitance of a victim of the aggressor/victim net pair;
    using the statistical effective capacitance to determine timing data used in the statistical timing analysis; and
    conducting an update process of the timing data and the statistical timing analysis due to the effect of the coupling capacitance on a particular net to reduce pessimism.

2. The method of claim 1, wherein the deterministic coupling information comprises multiplier/weighting factors.

3. The method of claim 2, wherein the statistical values comprise statistical capacitance values.

4. The method of claim 3, wherein the statistical capacitance values are parameterized.

5. The method of claim 1, wherein the deterministic coupling information comprise victim/aggressor window overlap information.

6. The method of claim 5, wherein the statistical values comprise statistical victim and aggressor slews and statistical coupling information.

7. The method of claim 1, further comprising expanding aggressor/victim overlap windows to account for optimism in the deterministic timing analysis.

8. The method of claim 1, further comprising for each block of the logic design for a predetermined set of sources of variation, determining a sensitivity of each of the predetermined set of sources of variation to each block of the logic design.

9. The method of claim 8, wherein the predetermined set of sources of variation comprise at least one of: process variations, environmental variations, device fatigue variations and phased-lock loop variations.

10. The method of claim 8, wherein determining a sensitivity of each of the predetermined set of sources of variation to each block of the logic design comprises, for each of the predetermined set of sources of variation, determining a change in delay between a lowest value of a variation range and a highest value of the variation range for each block of the logic design.

11. The method of claim 1, wherein the logic design comprises a combinational integrated circuit design.

12. The method of claim 1, wherein the logic design comprises a sequential integrated circuit design.

13. The method of claim 1, wherein the update process comprises:
    determining whether any segments of the particular net exhibit coupling;
    if the particular net exhibits coupling, determining whether slack of the particular net is less than a predetermined threshold;
    if the slack is less than the predetermined threshold, examining all segments of the particular net;
    calculating a new statistical effective capacitance of each victim;
    using the new statistical effective capacitance to determine new timing data; and
    updating the statistical timing analysis using the new timing data,
    wherein the worst case aggressor conditions are representative of a factor by which an effect of coupling capacitance on a net increases or decreases due to switching on the net.

14. The method of claim 13, wherein:
    determination of the factor by which the effect of coupling capacitance on the net increases or decreases comprises:
        determining a coupling capacitance adder factor using a formula of $A=\{IP/slew(aggressor)\}*min\{Amax, slew(victim)/interaction\ period\ (IP)\}*\{voltage(aggressor)/voltage(victim)\}$;
        determining a first factor by using a formula of $K=(predetermined\ value)+A$, for a late mode; and
        determining a second factor by using a formula of $K=(predetermined\ value)-A$, for an early mode;
    the IP is determined using a formula $IP=min(slew(victim), slew(aggressor), overlap)$;
    the statistical effective capacitance of each victim is determined using a formula $Ct=Cg+K*Cc$, for both the early mode and the late mode; and
    Cg is actual capacitance-to-ground for a segment and Cc is coupling capacitance for the segment.

15. A computer program product for performing statistical timing analysis of a logic design, including effects of signal coupling, comprising a tangible computer usable medium having readable program code tangibly embodied in the medium, the computer program product includes at least one component operable to:
    perform a deterministic analysis to determine deterministic coupling information for each aggressor/victim net pair of the logic design exhibiting coupling, assuming worst case aggressor conditions;
    perform a statistical timing analysis in which the deterministic coupling information for the each aggressor/victim net pair is combined with statistical values of the statistical timing analysis to determine a statistical effective capacitance of each victim of each aggressor/victim net pair;

use the statistical effective capacitance to determine timing data used in the statistical timing analysis;

conduct an update process of the timing data and the statistical timing analysis due to the effect of the coupling capacitance on a particular net to reduce pessimism; and for each block of the logic design for a predetermined set of sources of variation, determine a sensitivity of each of the predetermined set of sources of variation to each block of the logic design.

16. The computer program product of claim 15, wherein the deterministic coupling information comprises multiplier/weighting factors and the statistical values comprise statistical capacitance values.

17. The computer program product of claim 15, wherein the deterministic coupling information comprises victim/aggressor window overlap information and the statistical values comprise statistical victim and aggressor slews and statistical coupling information.

18. A method comprising the steps of:
providing a computer infrastructure operable to:
perform a deterministic analysis using a processor to determine deterministic coupling information for each aggressor/victim net pair of the logic design exhibiting coupling, assuming worst case aggressor conditions;

perform a statistical timing analysis in which the deterministic coupling information for each aggressor/victim net pair is combined with statistical values of the statistical timing analysis to determine a statistical effective capacitance of a victim of each aggressor/victim net pair;

use the statistical effective capacitance to determine timing data used in the statistical timing analysis; and conduct an update process of the timing data and the statistical timing analysis due to the effect of the coupling capacitance on a particular net to reduce pessimism.

19. The method of claim 18, wherein the deterministic coupling information comprises multiplier/weighting factors and the statistical values comprise statistical capacitance values.

20. The method of claim 19, wherein the deterministic coupling information comprises victim/aggressor window overlap information and the statistical values comprise statistical victim and aggressor slews and statistical coupling information.

* * * * *